Aug. 20, 1929.　　　　F. A. KOLSTER　　　　1,725,147

RADIO COMPASS COMPENSATOR

Filed June 2, 1924

INVENTOR
Frederick A. Kolster
BY
White Prost & Evans
his ATTORNEYS

Patented Aug. 20, 1929.

1,725,147

UNITED STATES PATENT OFFICE.

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA.

RADIO COMPASS COMPENSATOR.

Application filed June 2, 1924. Serial No. 717,292.

This invention relates to radio compass operation, and more particularly to the elimination of errors that arise in connection with the use of such compasses.

The theory and construction of radio compasses generally have been well described in prior patents and applications. Although there are several types of such compasses that may be used for example on shipboard, all of them so far as I know, are subject to errors arising from the character of the ship's mass; this effect may be attributed to the changes in wave front as it strikes the ship, whereby the apparent bearing of a distant source of radiations, as determined by the radio compass reading, differs slightly from the correct one. It is one of the objects of my invention to eliminate or minimize this error due to change in wave front, so that if any error at all remains, it will be of an entirely different order of magnitude and readily compensated for by other means.

I shall describe in this application an embodiment of my invention operating on a radio compass receiving circuit having a loop or coil acting as an absorber; such systems are usually in the form of a vertical, rotatably mounted coil, having the so-called "figure 8" directional characteristic. Furthermore, the application of my invention to a shipboard installation has been found particularly advantageous, due to the peculiar nature of the errors caused by the metallic mass of the ship and its accessories.

My invention possesses other advantageous features, some of which, with the foregoing, will be set forth at length in the following description, where I shall outline in full that form of the invention which I have selected for illustration in the drawings accompanying and forming part of the present application. Although I have shown in the drawings but one form of the invention, I do not desire to be limited thereto, since the invention as expressed in the claims may be embodied in other forms also.

Referring to the drawings.

Figure 3:
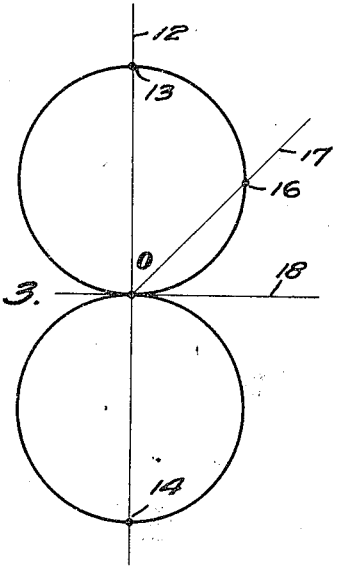
Fig. 3 is a curve illustrating the directional characteristic of the type of radio compass illustrated in the former figure.

In the form of radio compass that I have chosen for illustration, there is a rotatable coil 11 of a few turns, the axis of the coil being substantially horizontal, and its axis of rotation being vertical and at right angles to the coil axis. The arrangement is such that when the coil 11 has its plane pointing toward a source of radiations, the strength of the signals received differs substantially from that received in other coil positions. The direction of the source may thus be determined. The plane of the coil refers to that plane which intersects the axis at right angles, at the geometrical centre of the coil. When use is made of such a coil for absorbing electromagnetic radiations, the directional characteristic of the coil may be represented by a figure 8, such as illustrated in Fig. 3. If the coil 11 is assumed to be at the point $o$, with its plane parallel to the line 12, and if a source of radiations falls in line 12, either above or below the point $o$, there will be a maximum response in the receiver circuits, as indicated by the fact that the line 12 intersects the two loops of the figure 8 at the points 13 and 14, which are farthest distant from the point $o$ representing the position of the coil 11. Sources disposed in any other radial line extending from point $o$, such as 17, will cause a response the extent of which is indicated by the length $o^{16}$ of the radius included between the point $o$ and the figure 8, and drawn in the direction of the source. As the departure from line 12 comes nearer and nearer to the line 18, perpendicular to the plane of coil 11, the less does the response become, until at line 18 the response is a minimum. This minimum condition corresponds to the position ordinarily utilized for determining direction. For this purpose, coil 11 is slowly rotated while the response is noted, and when it becomes a minimum, the coil 11 is known to have its axis pointing toward the source, or in other words, that its plane is perpendicular to the source.

Figure 2:
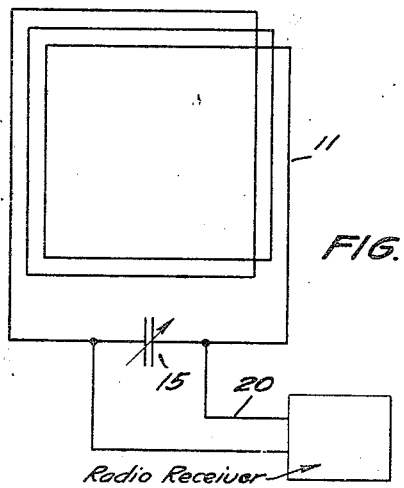
Fig. 2 is a skeletonized wiring diagram of the radio compass installation.

In Fig. 2, the circuit diagram is indicated for the receiving apparatus. The coil 11 forms an element of a non-uniform absorption system, which is tuned to resonance by the aid of the variable condenser 15 in series with the coil. A detector circuit 20 connected across the coil 11 indicates the degree of response in any well-known manner. Since the radio compass as thus described is also known, further description of its operation is considered unnecessary.

Figure 1:
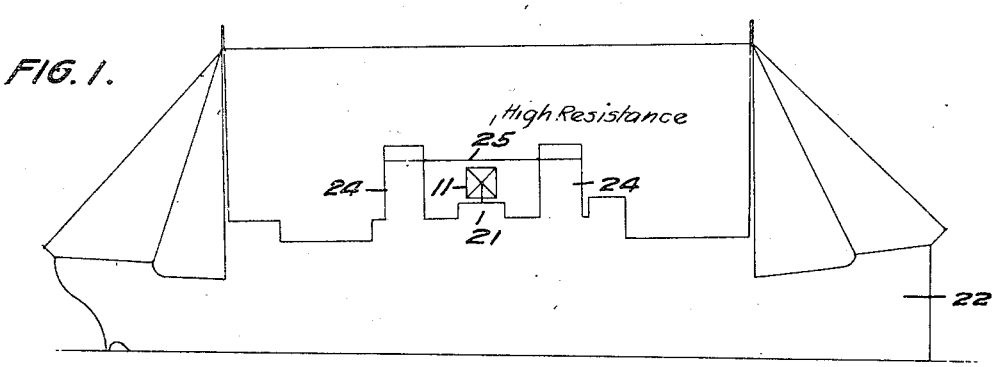
Figure 1 is a side elevation, mainly diagrammatic, of a radio compass installation on shipboard.

As shown in Fig. 1, the compass coil 11 is usually mounted on top of an enclosure 21 on the upper deck of the vessel 22. When located on such a vessel, it has been found that the metallic mass thereof deflects the wave front of the radiations received by the coil. This effect introduces an error that is considerable, and cannot be ignored. Thus when these errors exist, the coil axis, instead of pointing toward the source, must be turned through a small angle away from that position to secure minimum response in the detector circuit 20. The character of this error may be understood from a consideration of Fig. 4. Curve 23 represents the calibration curve of such a compass. The abscissæ of this curve represent the number of angular degrees a source of radiations is displaced from the longitudinal axis of the ship, which source is to affect the radio compass. The ordinates represent the errors of the compass readings corresponding to these relative positions of the source and the vessel. For example, when the source is parallel or perpendicular to the longitudinal axis of the vessel 22, the errors are reduced to zero, as indicated at the points marked 0°, 90°, 180°, 270°, and 360°. However, at intermediate positions of the source, the errors fluctuate somewhat in the manner of a sine curve, being for example positive and of varying values between 0° and 90°, as well as between 180° and 270°, while it is negative and of varying values between 90° and 180°, as well as between 270° and 360°.

These errors of course could be determined and plotted, and the proper corrections applied to the readings, but such a course is not only time consuming and laborious, but likely to lead to errors that may produce serious and irreparable injury. To overcome these disadvantages, I provide an arrangement whereby the direction of the wave front is seemingly operated upon before it can affect the compass, in such manner that it no longer causes errors in the compass. In other words, the correction is applied to supplement the radiations themselves, and the correcting force as well as the radiations are caused to affect the compass simultaneously, whereby the radiations behave as if they were not deflected by the ship's mass. Although in some instances a very small residual error may remain, I find it nevertheless possible to neutralize the errors in this manner substantially entirely. At any rate, whatever errors do remain can very readily be taken care of in other ways, not necessary at this time to describe.

The arrangement by which I am enabled to effect these highly beneficial results, includes the placing of an auxiliary non-uniform absorbing circuit in proper relation to the compass coil 11, so as to affect it by magnetic coupling. For example, I may use the stay wire 25 extending between the stacks of the vessel to serve as part of a system absorbing energy from the radiations. This wire is close enough to the top of coil 11 to act as a primary for it. In other words, current flowing in wire 25 has its counterpart in current induced by transformer action in coil 11. The wire 25 thus affects the radio compass by inductive coupling. Furthermore, I find that to secure the neutralizing effect, the wire 25 should be parallel to the longitudinal axis of the ship 22, and it may form merely one side of a loop absorbing circuit, the remainder comprising the metallic stacks 24, and the hull of vessel 22.

In fact, it is possible to substitute for the arrangement described, other forms of loop circuits which directly absorb the radiations, and transfer at least some of its energy by appropriate coupling to the radio compass coil. To regulate the effect of this compensating arrangement, it is of course necessary to choose the position of the compensating loop properly with respect to the surroundings, whether on shipboard or on land, and to design this loop circuit with the proper amount of resistance for the best effect. This latter requirement may easily be fulfilled by using a selected size and length of stay wire. A high resistance is to be preferred in order to make the compensating loop as perfectly aperiodic as practicable, so that no material variation in the character of the response with varying frequencies may occur.

Figure 4:
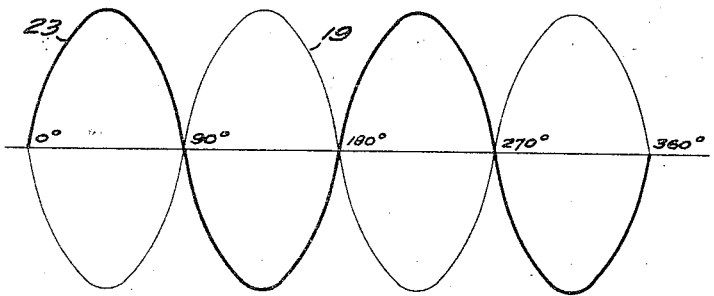
Fig. 4 shows a set of curves by which it is possible to demonstrate the utility of the present invention.

The operation of the compensating arrangement may readily be described in connection with Fig. 4. When the plane of coil 11 is perpendicular to the axis of the ship 22 and in position to respond to a minimum extent to a source in line with the longitudinal axis of the ship, there is no error in the indication, as represented by the 0° point on curve 23. Now, although the loop, of which wire 25 forms a part, is in proper position for maximum response from the source, yet the current flowing in this wire does not affect the loop 11, for they are not in inductive coupling. The result is that for this condition, the compensation is zero, as it should be. Similarly, when the source is in a line perpendicular to the axis of the vessel 22, the error is again zero, as indicated at the 90° point of curve 23. The compensation is also zero, for the loop of which wire 25 is a part, is in proper position with respect to the source so as not to absorb any energy therefrom; therefore there is no current in wire 25, and there can be no compensation, even if the coil 11 and this wire is in good inductive relation. Similar conditions exist at the other zero points—either no current is flowing in wire 25, or else it is not in energy transferring relation with respect to coil 11.

It is found that when the source is intermediate the two positions represented by the zero error positions, the current induced in coil 11 from wire 25 is in such phase relation that it opposes the error. This effect is shown by the light line curve 19 of Fig. 4. By proper choice of constants of the loop of which wire 25 forms a part, the compensation may be made substantially complete for all positions of the source. This is indicated in Fig. 4 by the fact that the ordinates of curve 19 are equal but opposite in sign to those of curve 23.

I claim:

1. The method of reducing errors in a radio compass having a rotatable coil acting as an absorber of electromagnetic radiations, and mounted in proximity to conductive masses which act on the radiations in such manner as to cause errors in the compass indications, which comprises absorbing energy in an absorbing circuit including said masses, from the same source from which the coil absorbs energy, and coupling said absorbing circuit to the coil in such manner that energy is transferred thereto which compensates for the error.

2. In a radio compass, a rotatable coil acting as an absorber of electromagnetic radiations, and adapted to be brought to a position indicating the direction of a source of radiations by the character of its response to the radiations, and means for compensating for errors in the indications, comprising an absorbing circuit in the form of a loop inductively coupled to the coil and including conductive masses effecting said errors.

3. In a radio compass, a rotatable coil acting as an absorber of electromagnetic radiations, and adapted to be brought to a position indicating the direction of a source of radiation by the character of its response to the radiations, and means for compensating for errors in the indications, comprising a stationary loop including conductive masses effecting said errors absorbing energy from the same source as the coil, and arranged to be inductively coupled to the coil to transfer energy thereto, the extent of said coupling depending upon the relative position of the coil and loop.

4. In a radio compass system comprising a directional coil disposed in proximity to conductive masses causing distortion of the wave front of the received energy and rotatable with respect to the bearing of the source of said energy and with respect to said masses, and a closed circuit fixed with respect to said masses and comprising at least a portion of said masses, the method which comprises effecting between said coil and circuit a coupling of a character compensating for errors due to wave front distortion.

5. In a ship's radio compass system comprising a directional coil disposed in proximity to conductive masses of the ship causing distortion of the wave front of the received energy and rotatable with respect to the bearing of the source of said energy and with respect to said masses, and a closed circuit fixed with respect to said masses and comprising at least a portion of said masses and a conductor disposed substantially parallel to the fore and aft line of the ship, the method which comprises effecting between said conductor and said coil a coupling of a character compensating for errors due to wave front distortion.

6. A radio compass system comprising a circuit including a coil rotatable with respect to the bearing of a source of electro-magnetic radiations and disposed adjacent masses causing distortion of the wave front of energy from said source, and a fixed circuit including at least a portion of said masses and so inductively related to the circuit of said coil as to compensate for error due to wave front distortion for different positions of said coil.

7. A radio compass system comprising a coil rotatable with respect to the bearing of a source of electro-magnetic radiations and disposed adjacent masses causing distortion of the wave front of energy from said source, and a fixed circuit including a conductor and at least a portion of said masses, said coil so disposed with respect to said conductor as to effect therewith a coupling of a character to compensate for error due to wave front distortion for different positions of said coil.

8. A ship's radio compass system comprising a circuit including a coil rotatable with respect to the bearing of a source of electro-magnetic radiations and disposed adjacent masses causing distortion of the wave front of energy from said source, and a circuit fixed with respect to the ship and including at least a portion of said masses and a conductor disposed substantially parallel to the fore and aft line of the ship, said circuits being so related as to effect therebetween a coupling of a character to compensate for error due to wave front distortion for different positions of said coil.

9. A directional radio receiving system comprising a closed tunable circuit including a rotatable coil absorbing directly from a natural medium energy radiated from a distant source, and a closed circuit of high resistance having a directional characteristic inductively related to said system for compensating for effect of wave front distortion throughout the range for which said first circuit is tunable.

10. A radio compass system on board ship comprising a closed tunable circuit including a directional coil rotatable to position indicating the bearing of a source of energy and directly absorbing from the natural medium energy radiated by said source, and a closed circuit having a directional characteristic disposed in fixed position in direct inductive relation to said coil, and of high resistance to compensate for effect of wave front distortion throughout the range for which said first circuit is tunable.

In testimony whereof, I have hereunto set my hand.

FREDERICK A. KOLSTER.